United States Patent
Hawks et al.

(10) Patent No.: US 6,637,374 B2
(45) Date of Patent: Oct. 28, 2003

(54) DEVICE FOR HEATING AN ENCLOSED SPACE FOR ANIMALS

(75) Inventors: Randall D. Hawks, 2300 Carlford Rd., Pleasant Garden, NC (US) 37313; Gary L. Kolbet, 2503 White Fence Way, High Point, NC (US) 27265

(73) Assignees: Randall D. Hawks, Pleasant Garden, NC (US); Gary L. Kolbet, High Point, NC (US)

( * ) Notice: Subject to any disclaimer, the term of this patent is extended or adjusted under 35 U.S.C. 154(b) by 102 days.

(21) Appl. No.: 09/909,079

(22) Filed: Jul. 19, 2001

(65) Prior Publication Data

US 2003/0015146 A1 Jan. 23, 2003

(51) Int. Cl.[7] .......................... A01K 1/00; A01K 31/00; F24F 7/00
(52) U.S. Cl. ........................................ 119/448; 119/493
(58) Field of Search ................................ 119/448, 493, 119/508; 165/53; 219/213, 386

(56) References Cited

U.S. PATENT DOCUMENTS

| | | | |
|---|---|---|---|
| 1,713,013 A | 5/1929 | Wandless | |
| RE17,857 E | 11/1930 | Burgher | |
| 1,840,261 A | 1/1932 | Sideman | |
| 2,252,191 A | 8/1941 | Marks | |
| 2,333,915 A | 11/1943 | Budd | |
| 2,689,906 A | 9/1954 | Corbett | |
| 3,051,816 A | 8/1962 | Knoll et al. | |
| 3,068,341 A | 12/1962 | Ortiz et al. | |
| 3,097,287 A * | 7/1963 | Knoll et al. | 165/53 |
| 3,160,139 A | 12/1964 | Wales, Jr. | |
| 4,124,794 A | 11/1978 | Eder | 219/530 |
| 4,249,065 A | 2/1981 | Malone | 219/220 |
| 4,298,788 A | 11/1981 | Jones et al. | 219/386 |
| 4,307,284 A | 12/1981 | Perron | 219/342 |
| 4,558,209 A | 12/1985 | Hess | 219/530 |
| 4,600,857 A | 7/1986 | Suhar | 313/35 |
| 5,003,923 A | 4/1991 | Morgan | |
| 5,272,316 A | 12/1993 | Chesnut | 219/385 |
| 5,511,145 A | 4/1996 | Bailey et al. | 392/355 |
| 5,746,271 A | 5/1998 | DeCosta | 165/53 |
| 5,809,936 A | 9/1998 | Wall | 119/484 |
| 5,865,144 A * | 2/1999 | Semenuk | 119/493 |
| 5,880,434 A * | 3/1999 | Pinnow et al. | 219/386 |
| 5,922,227 A | 7/1999 | McMurtrie | 219/220 |
| 6,072,938 A | 6/2000 | Peterson et al. | 392/343 |
| 6,134,386 A | 10/2000 | O'Donnell | 392/432 |
| 6,205,290 B1 | 3/2001 | Hung et al. | 392/373 |

FOREIGN PATENT DOCUMENTS

SU 829067 5/1981

OTHER PUBLICATIONS

Copy of Lectro Pad Product Page from Internet, date unknown but believed to be prior art, 2 pages.
Copy of Heat Exchange Applied Technology, Inc. Product Page from Internet, date unknown but believed to be prior art, 3 pages.
Copy of Advertisement for Tempco Electric Heater Corporation, date unknown but believed to be prior art, 1 page.

* cited by examiner

*Primary Examiner*—Charles T. Jordan
*Assistant Examiner*—Elizabeth Shaw
(74) *Attorney, Agent, or Firm*—Womble, Carlyle Sandridge & Rice, PLLC

(57) ABSTRACT

A device for heating a small house of the type used for sheltering small animals, including doghouses and the like, including a conduit forming a passage for air, the conduit having an inlet end and a discharge end and forming a passage for air, at least one heating element for warming air passing around the heating element, at least one fan mounted in the conduit between the intake end and the discharge end, and a connector for electrically connecting the heating element and the fan with an electrical power supply.

22 Claims, 4 Drawing Sheets

DEVICE FOR HEATING AN ENCLOSED SPACE FOR ANIMALS

FIELD OF THE INVENTION

The present invention relates to the field of animal care, and, more particularly, to devices for sheltering and protecting small animals from exposure to the outdoor elements.

BACKGROUND OF THE INVENTION

Recent years have seen a proliferation of different sizes and shapes of doghouses, shelters, kennels, and cages. Most have been designed and marketed for small animals that spend most, if not all, of their lives outside. However, when weather conditions result in extremely cold temperatures, these houses and shelters offer little protection. This means that owners are often required to make other arrangements for their small animals such as bringing them indoors and placing them in uncomfortably small crates. This is not only troublesome for the owners, but also disruptive to the normal habits of the animal, entailing distressful and unhealthy conditions for the animals. When cold conditions persist for a long period, the quality of life of both animal and owner is severely diminished.

Heating devices have been developed for keeping small animals warm, but these have focused on indoor pets. For example, there are known in the art birdcage heaters, small animal incubators, and indoor basking beds. There are heating pads for animals to lay on, but these are also intended principally for indoor use and would provide minimal protection if used outdoors. One invention specifically intended for outdoor use is a climate-controlled doghouse with an installed heating and air conditioning unit. However, that construction is complex, expensive, and the heating and air conditioning unit cannot be used separable from the doghouse. There is also known a doghouse having an internally located heating element, but that device is unable of providing adequate heating during extremely cold conditions. Unlike houses where ductwork and air handlers may be installed between walls or in crawl or attic spaces, doghouses and the like lack similar structure for the installation or mounting of a forced air system.

SUMMARY OF THE INVENTION

The present invention is directed to a simple, safe heating device that addresses the problems described above. The heating device of the present invention is compact and easily installed or removed, simple and inexpensive, and durably formed for outside use.

One embodiment of the present invention is to provide a device for heating a small house, such as doghouses and the like, of the type used for sheltering small animals, and that is mounted on the exterior of the house. The device includes a heating element and fan mounted in a conduit and in electrical communication with an external electrical power supply. The conduit has an air intake end and air discharge end. The fan pulls return air from the enclosed space through the air intake of the housing where the air passes over the heating element and is heated to a desired temperature, then discharged to the enclosed space.

The conduit is desirably constructed like conventional rectangular ductwork, but may alternatively be round. The intake end of the conduit is adapted to be mounted about an opening formed in a wall or the roof of the enclosure and the discharge end is adapted to be mounted about another opening formed in a wall or the roof.

At least one heating element is mounted within the conduit. The heating element is desirably a resistance coil, but other resistive elements known in the art may be suitably configured and disposed within the housing. A heating element rated at about 400 watts provides an effective heat load to an average enclosed space of about 25 cubic feet. Heating elements of differing ratings may be combined with regulating devices to achieve a desired thermal output.

At least one fan is mounted within the conduit. The fan is desirably an axial fan, but other types of fans known in the art may be suitably configured and disposed within the housing. A fan rated at about 70 CFM provides an effective airflow to transfer the energy from a 400 watt heating element to the enclosed space. Fans of differing ratings may be combined with regulating devices to achieve a desired airflow.

As those knowledgeable of heat transfer will appreciate, the output of the heating element and fan may be increased or decreased as the surface area, insulation value of the enclosure, and the volume of the enclosed space, are increased or decreased.

The heating element and fan are electrically connected to an external electrical power source such as a standard 110-volt outlet. The connector may be a conventional power cord. Desirably, since the heating device of the present invention is intended for outdoor use, the connector is moistureproof and grounded. To protect the animal from electric shock, the connector may include a protective outer casing to prevent an animal from gnawing or chewing into the connector. The connector may further include a thermostatic controller that is either attached to the housing or placed in electrical communication with the external power supply.

In a second embodiment, the heating device is constructed for installation inside the small animal shelter. Mounting tabs or flanges are affixed or formed on the intake and discharge ends of the conduit for mounting the heating device on a wall or ceiling, thus positioning the heating device above and away from the animal. In all other respects, other than the installed location, this embodiment is functionally similar to the first embodiment.

These and other aspects of the present invention will become apparent to those skilled in the art after a reading of the following description of the preferred embodiments, when considered in conjunction with the drawings. It should be understood that both the foregoing general description and the following detailed description are exemplary and explanatory only and are not restrictive of the invention as claimed.

DETAILED DESCRIPTION OF THE PREFERRED EMBODIMENTS

Figure 1:
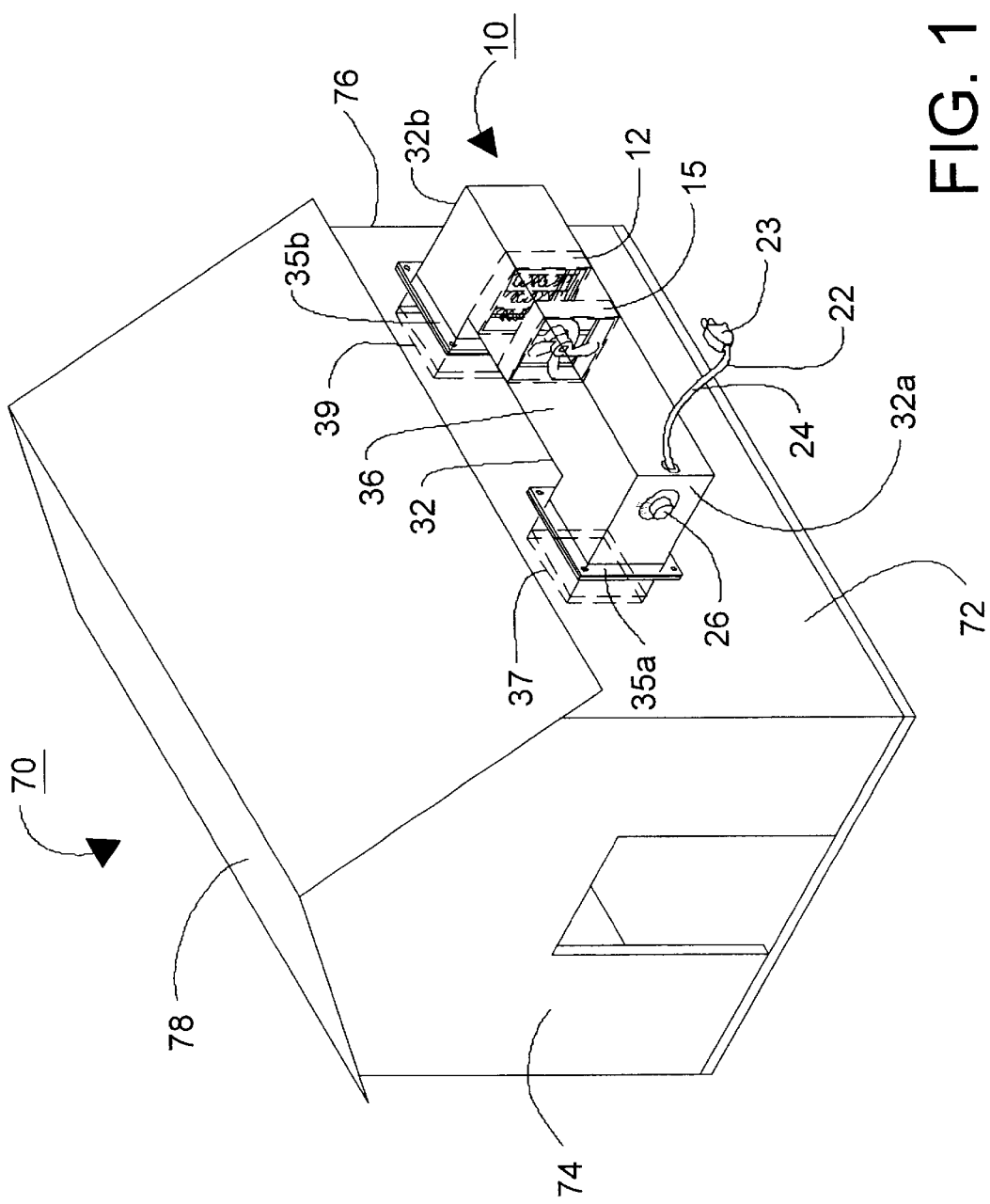
FIG. 1 is an environmental view of the heating device of the present invention mounted on the exterior of a small animal house.
Figure 2:
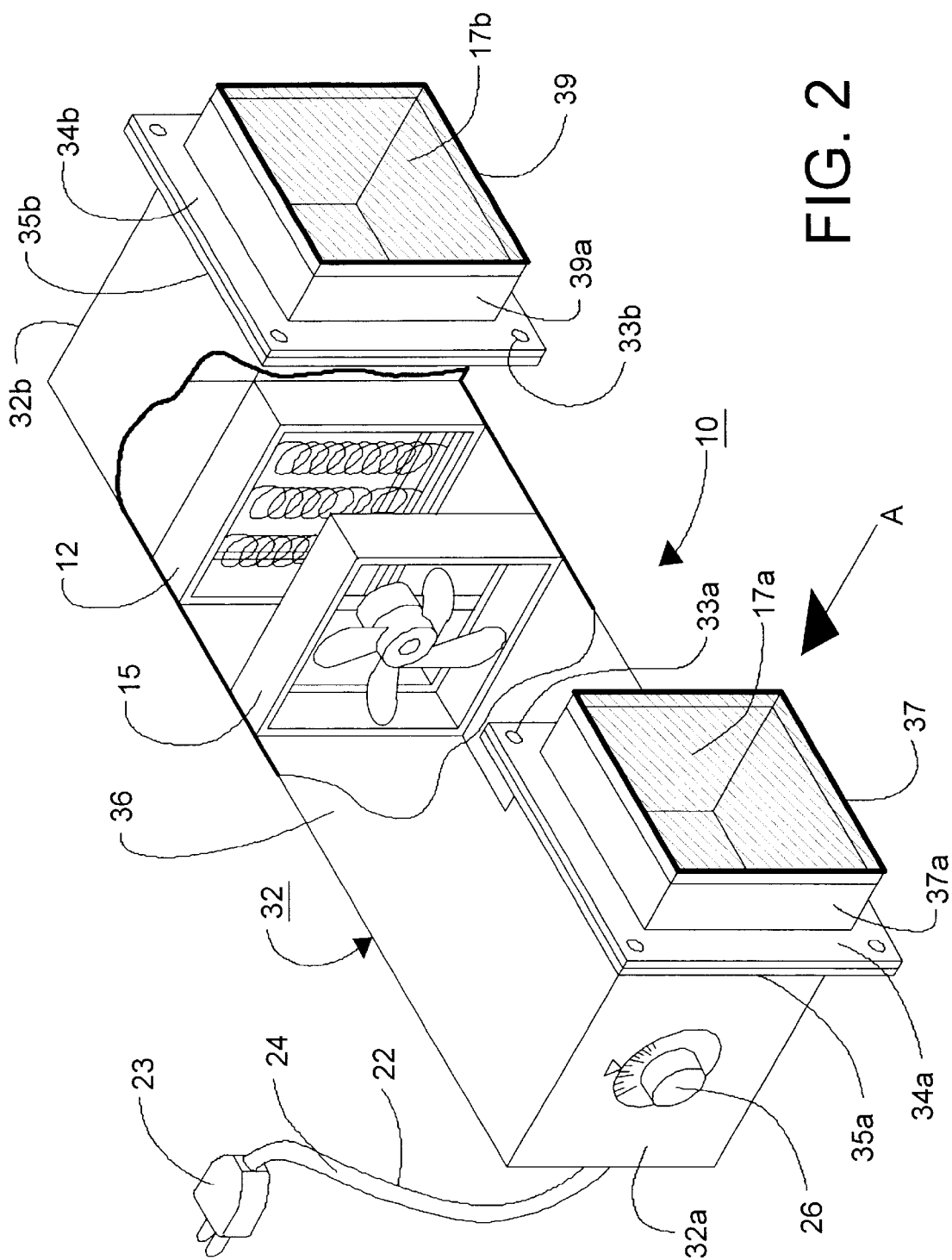
FIG. 2 is a perspective view of the heating device of FIG. 1 with a section broken away to illustrate the heating element and fan of the heating device.

As shown in FIGS. 1 and 2, the present invention is directed to a device for heating an enclosed space, such as a doghouse, used to shelter small animals. Turning to FIG. 1, there is shown an animal shelter 70 having a heating device 10 mounted thereon. The shelter 70 has a plurality of walls including side walls 72, front wall 74, rear wall 76, and roof 78. Shelter 70 may take on many forms other than the conventional doghouse. Heating device 10 is mounted to a side wall 72 such that the flanges 35a, 35b are mounted against the exterior surface of wall 72. Alternatively, heating device 10 may be installed to other wall surfaces of the animal shelter 70, including the roof 78. Referring to FIG. 2, the heating device includes a conduit 32, at least one heating element 12, at least one fan 15, and a connector cable 22 for electrically communicating the heating element 12 and fan 15 with an electrical power supply (not shown).

In a first embodiment, the heating device of the present invention is so constructed for installation on the exterior of the enclosed space or animal shelter. Preferably, the conduit 32, or ductwork, is formed of sheet metal or a rigid plastic that has some degree of resistance to the elements and is water-tight. Other materials such as wood, carbon steel, stainless steel, aluminum, fiberglass and other composites suitable for external exposure may also be substituted.

The conduit 32 has an intake end 37 and a discharge end 39. The intake end 37 has a flanged portion 35a formed around the periphery of intake end 37 so that the intake end may be rigidly fastened to the structure on which it is installed. Intake end 37 has an extension portion 37a extending inwardly from flange 35a to penetrate the opening (not shown) in the wall or roof of the enclosed space. While this extension is not required for proper installation, it facilitates proper alignment and serves as an installation aid. Holes 33a spaced around the flange enable the intake end 37 to be fastened to the exterior surface using screws, bolts, or other conventional fasteners known in the art. To ensure that the connection between the heating device and the shelter is watertight, a seal or gasket 34a is positioned around the periphery of the flange 35a. Seal 34a may be formed of any of the conventional materials known in the art including foam, rubber, silicon, etc. At the opposed end of the conduit 32 is the discharge end 39. The discharge end 39 also has a flanged portion 35b and an extension portion 39a. In all respects, the discharge end 39 is formed and constructed like the intake end 37. Formed with and disposed between the intake end 37 and the discharge end 39 is an air passage section 36 formed of the same material and having substantially the same cross section as the openings of the intake and discharge ends 37, 39. While illustrated with right angle elbows 32a and 32b, the conduit 32 may well be smooth and rounded as long as a continuous, unobstructed passage is formed therealong for the effective conveyance of air. As those skilled in the art will appreciate, it is not necessary that both the intake and the discharge ends of the conduit be mounted on the same exterior wall or roof portion, and it is not necessary that the intake and discharge ends have the same orientation. Depending upon the type of enclosure, the relative positions of the intake and discharge ends may vary considerably.

As best seen in FIG. 2, a heating element 12 is mounted within the air passage section 36 of conduit 32. The heating element 12 shown in FIG. 2 is illustrative of a resistance coil commonly known in the art and commercially available. It has been found that a heating element rated between about 200 watts and 600 watts, and desirably about 400 watts, provides the desired heat load for the present invention; i.e., heating an enclosure with an average heated volume of about 25 cubic feet. One such resistance coil is a 400-watt element available from McMaster-Carr Supply Company of Atlanta, Ga. as Item No. 20055K21. Heating element 12 is secured within the conduit 32 using any of the conventional attachment means including bolting, riveting, spot welding, or adhesively bonding, dependent upon the type and size of the element chosen and the material from which the conduit 32 is formed.

A fan 15 is mounted in the air passage section 36 of the conduit 32 to supply active ventilation across heating element 12. As shown in FIG. 2, the direction of airflow is shown by arrow A. While fan 15 could be downstream of heating element 12, it is desirably upstream so that the fan 15 is not subjected to a heated airflow, which would diminish the service life of the fan 15. The fan 15 shown in FIG. 2 is illustrative of an axial fan commonly known in the art and commercially available. It has been found that an axial fan rated between about 35 CFM and 150 CFM, and desirably about 70 CFM, provides the desired airflow for the present invention. One such fan is an axial fan available from McMaster-Carr Supply Company of Atlanta, Ga. as Item No. 1976K42.

An electrical connector 22 is provided to electrically communicate heating element 12 and fan 15 with an external electrical power supply (not shown). The electrical connector in its simplest form is a grounded power cord such as conventional 12 gauge, 3-conductor covered wiring for exterior use. Such electrical wiring is well known in the art and rated for 110-volt use. Connector cable 22 is disposed through an aperture formed through conduit 32 and electrically attached using wire nuts, spring retainers, or screws, as dictated by the type and model of heating element. Such fastening means are conventional and well known in the art. A seal or sealant material is placed around the aperture/cable interface to ensure a watertight seal.

A standard 3-prong plug 23 is attached to the outer end of cable 22 for plugging into a conventional household 110-volt grounded (such as a ground fault interruptible circuit) outlet. To protect chewing or gnawing animals from electrical shock, the connector 22 includes a protective outer casing or sheath 24 such as a flexible metallic conduit, well known in the art.

While not required for satisfactory performance of the heating device, a thermostatic controller 26 is electrically connected between heating element 12 and plug 23, and appropriately positioned in the conduit 32. As shown in FIG. 2, thermostatic controller 26 is installed on the exterior of the conduit. Thermostatic controller 26 allows the animal owner to variably regulate the thermal output of the heating element 12 depending upon the ambient temperature in the shelter, as well as the size of the enclosed space. One such suitable thermostatic controller 26 is a model HT adjustable thermostat available from Bimet Corporation of Morris, Ill. The thermostatic controller 26 may be housed in a separate enclosure or within the conduit 32. Alternatively, other devices such as potentiometers may be used to achieve the same result by regulating the output of the heating element.

Optionally, a temperature safety switch (not shown) is connected between the plug 23, and the heating element 12. The temperature safety switch provides protection against the heating device overheating should the air intake 37 or air discharge 39 become obstructed. One such suitable temperature safety switch is a model HF non-adjustable thermostat available from Bimet Corporation of Morris, Ill.

An air filter and/or screen 17a, 17b is attached and appropriately positioned over air intake 37 and air discharge 39, respectively; however, at the discharge 39, only a screen is required. The air filter and/or screen 17a, 17b prevents dust and debris, and the animal, from coming in contact with the heating element 12. One suitable air filter is model# 19155K23 available from McMaster-Carr Supply Co. of Atlanta, Ga. The air filter and/or screen 17a, 17b is secured at the air intake 37 and air discharge 39 using any of the conventional attachment means including bolting, riveting, spot welding, or adhesively bonding, dependent upon the type and size of the air filter and/or screen chosen and the material from which the conduit 32 is formed. As those skilled in the art will appreciate, the air filter may be removably attached in a number of ways to facilitate changeout, cleaning, etc.

Figure 3:
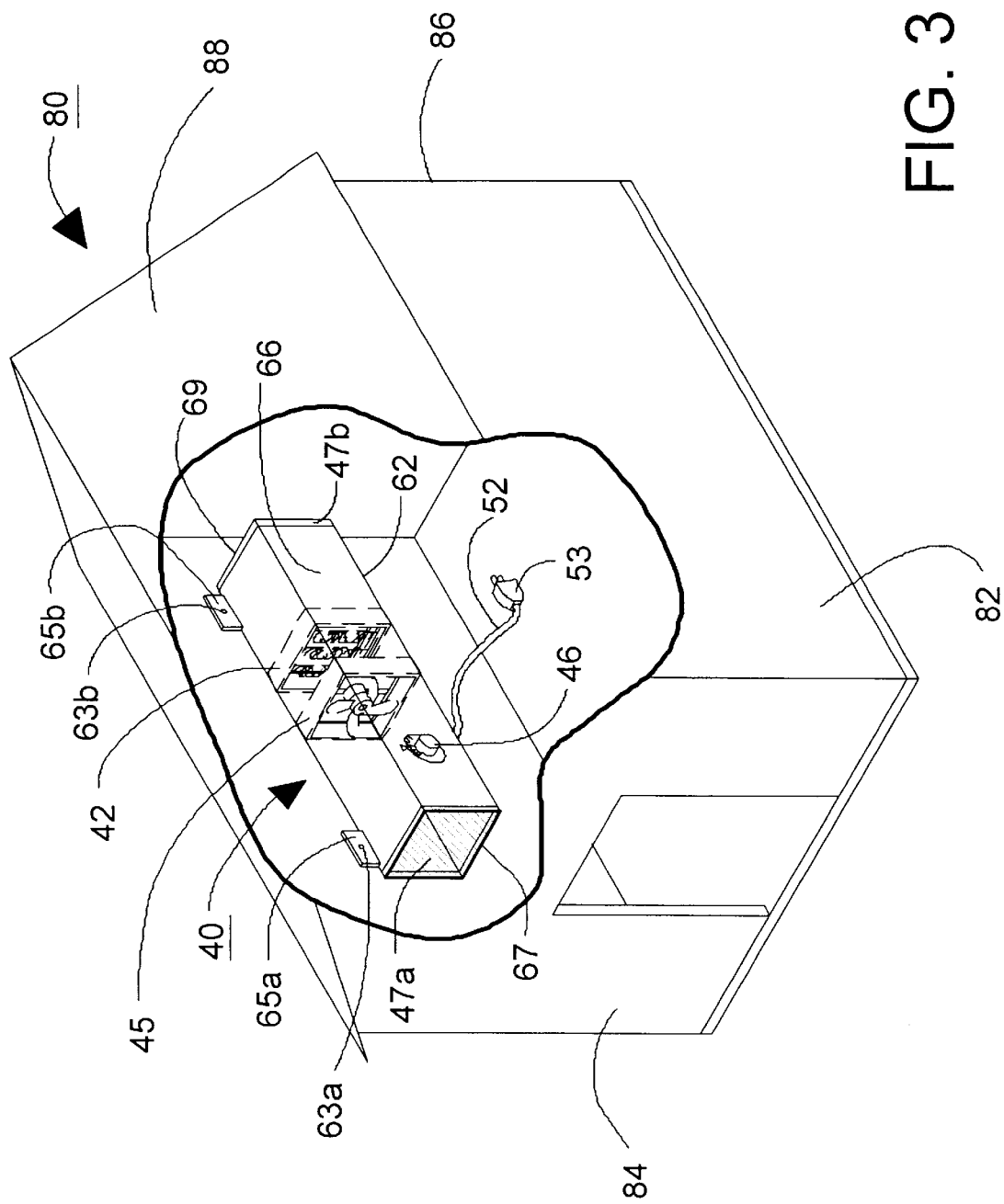
FIG. 3 is an environmental view of the alternative embodiment of the present invention mounted inside a small animal house.
Figure 4:
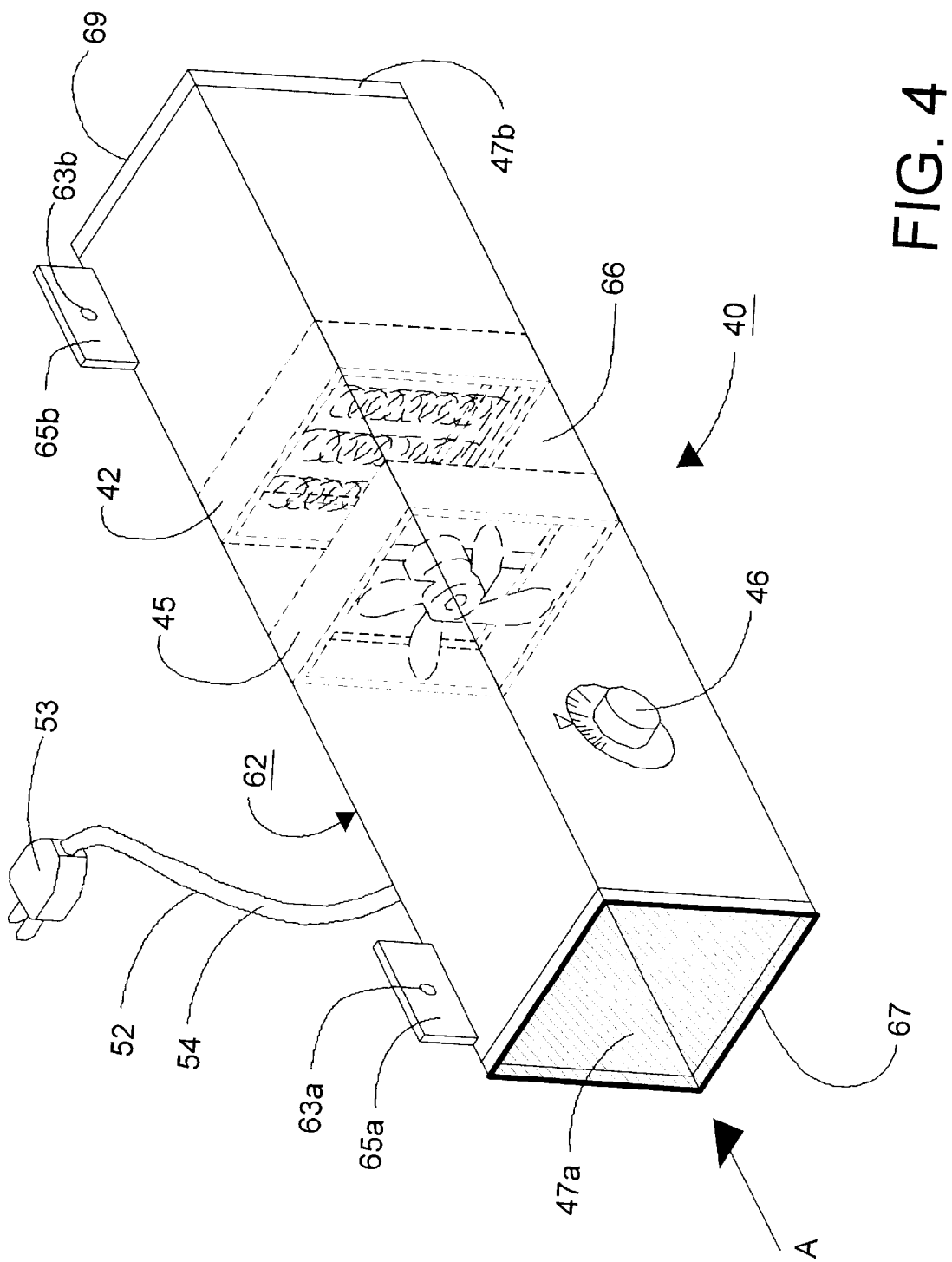
FIG. 4 is a perspective view of the alternative embodiment of the heating device of FIG. 3.

Turning to FIG. 3, there is shown an animal shelter 80 having a heating device 40 mounted therein. The shelter 80 has a plurality of walls including side walls 82, front wall 84, rear wall 86, and roof 88. Heating device 40 is mounted to a side wall 82 such that the mounting tabs 65a, 65b are mounted against the interior surface of wall 82. Alternatively, heating device 40 may be installed on or supported from the ceiling of the shelter 80. As shown in FIG. 4, a second embodiment of the heating device 40 includes a generally square conduit 62 with an inlet end 67 and discharge end 69, and an air passage section 66 therebetween. Conduit 62 is also formed of sheet metal, rigid plastic, or other suitable material. The conduit functions and features are generally the same as the first embodiment except that the heating device 40 is intended for installation within the enclosure. Heating element 42 and fan 45 are of the same type described hereinabove and are disposed inside the conduit as with the previous embodiment.

Holes 63a, 63b formed through the mounting tabs 65a, 65b enable the intake end 67 and discharge end 69 respectively to be fastened to the interior wall or ceiling of the shelter using screws, bolts, or other conventional fasteners know in the art. A thermostatic controller 46 with sensor is desirably installed within the air passage section 66 to maintain the temperature within the enclosure at a prescribed level. A temperature safety switch (not shown) is optionally connected between the plug 53, and the heating element 42. A filter and/or screen 47a, 47b may be installed over the inlet end 67 and the discharge end 69 respectively to prevent debris or animal access as described hereinabove. An electrical cable 52 or other suitable connector interconnects the heating element 42 and fan 45 as described hereinabove with an electrical power supply (not shown).

In operation, the device is turned on by either plugging the electrical connector into a grounded electrical outlet or by turning the thermostatic controller to an off position where the controller includes that feature. The sensor located within the conduit senses the relative ambient temperature of the air inside the animal shelter and provides a signal to the thermostatic controller so that the controller can continuously control the output of the heating element. That is, when the ambient air temperature is sensed as being below a desired value, the heating element and fan are turned on to begin warming and circulating the air within the animal shelter. The heating element and fan continue to operate until the thermostatic controller senses that the ambient temperature is at or above the desired setpoint.

Although the present invention has been described with a preferred embodiment, it is to be understood that modifications and variations may be utilized without departing from the spirit and scope of the invention, as those skilled in the art will readily understand. Such modifications and variations are considered to be within the purview and scope of the appended claims and their equivalents.

We claim:

1. A device for heating a small house of the type used for sheltering small animals, including doghouses and the like, comprising:
   (a) a conduit forming a passage for air therethrough, including:
      (i) an intake end having a flange for mounting around a first opening in the house, said intake end for the removal of cool air from the house;
      (ii) a discharge end substantially removed from the intake end and having a flange for mounting to a second opening in the house for discharge of warm air into the house;
      (iii) said conduit so formed for installation outside of the house;
   (b) at least one heating element for warming air passing therearound, said heating element mounted in said conduit between said intake end and said discharge end;
   (c) at least one fan, said fan mounted in said conduit between said intake end and said discharge end, said fan for moving air through the conduit; and
   (d) at least one connector for electrically connecting said at least one heating element and said at least one fan with an electrical power supply.

2. The heating device of claim 1 wherein when said conduit is mounted to first and second openings of said enclosure, said conduit is sealed against penetration by moisture external to said enclosure.

3. The heating device of claim 1 wherein said at least one heating element is rated between about 200 and 600 watts.

4. The heating device of claim 1 wherein said at least one fan is rated between about 35 and 150 CFM.

5. The heating device of claim 1 wherein said at least one connector further includes a protective outer casing.

6. The heating device of claim 1 further includes a thermostatic controller, said thermostatic controller disposed in electrical communication with said at least one connector.

7. A device for heating a small house of the type used for sheltering small animals, including doghouses and the like, comprising;
   (a) a conduit for mounting adjacent an inner surface of the house, said conduit having an inlet end and a discharge end and forming a passage for air therethrough, including:
      (i) an intake end for the removal of cool air therefrom said enclosure;
      (ii) a discharge end substantially removed form the intake end for the discharge of warm air therein said enclosure;
      (iii) at least one mounting member for mounting the conduit adjacent the inner surface of the house;
   (b) at least one heating element for warming air passing therearound, said heating element mounted in said conduit between said intake end and said discharge end;
   (c) at least one fan, said fan mounted in said conduit between said intake end and said discharge end, said fan for moving air through the conduit; and
   (d) at least one connector for electrically connecting said at least one heating element and said at least one fan with an electrical power supply.

8. The heating device of claim 5 wherein said at least one heating element is rated between about 200 and 600 watts.

9. The heating device of claim 5 wherein said at least one fan is rated between about 35 and 150 CFM.

10. The heating device of claim 5 wherein said at least one connector further includes a protective casing.

11. The heating device of claim 5 further including a thermostatic controller, said thermostatic controller disposed in electrical communication with said at least one connector.

12. An animal shelter having an enclosed space comprising:
 (a) a plurality of walls and a roof
 (b) a conduit forming a passage for air therethrough, including:
  (i) an intake end so configured to mount in a first opening in said shelter for the removal of cool air therefrom;
  (ii) a discharge end substantially removed from the intake end and so configured to mount in a second opening in said shelter for the discharge of warm air therein;
 (c) at least one heating element for warming air passing therearound, said heating element mounted in said conduit between said intake end and said discharge end;
 (d) at least one fan, said fan mounted in said conduit between said intake end and said discharge end, said fan for moving air through the conduit; and
 (e) at least one connector for electrically connecting said at least one heating element and said at least one fan with an electrical power supply.

13. The animal shelter of claim 12 wherein said at least one heating element is rated between about 200 and 600 watts.

14. The animal shelter of claim 12 wherein said at least one fan is rated between about 35 and 150 CFM.

15. The animal shelter of claim 12 said at least one connector further includes a protective outer casing.

16. The animal shelter of claim 12 further including a thermostatic controller, said thermostatic controller disposed in electrical communication with said at least one connector.

17. The device of claim 1 wherein the conduit has an arcuate portion connecting the intake end and discharge end.

18. The device of claim 1 wherein the conduit includes angular portions connecting the intake end and discharge end.

19. The device of claim 5 wherein the conduit has an arcuate portion connecting the intake end and discharge end.

20. The device of claim 5 wherein the conduit includes angular portions connecting the intake end and discharge end.

21. The animal shelter of claim 12 wherein the conduit has an arcuate portion connecting the intake end and discharge end.

22. The animal shelter of claim 12 wherein the conduit includes angular portions connecting the intake end and discharge end.

* * * * *

UNITED STATES PATENT AND TRADEMARK OFFICE
CERTIFICATE OF CORRECTION

PATENT NO. : 6,637,374 B2
DATED : October 28, 2003
INVENTOR(S) : Randall D. Hawks and Gary L. Kolbet It is certified that error appears in the above-identified patent and that said Letters Patent is hereby corrected as shown below:

<u>Column 6,</u>
Lines 64 and 66, delete "5" and insert therefor -- 7 --.

<u>Column 7,</u>
Lines 1 and 3, delete "5" and insert therefor -- 7 --.

<u>Column 8,</u>
Line 6, after "12" insert -- wherein --.
Lines 16 and 18, delete "5" and insert therefor -- 7 --.

Signed and Sealed this

Twenty-seventh Day of January, 2004

JON W. DUDAS
*Acting Director of the United States Patent and Trademark Office*